2,804,450

POLYCHLOROPRENE THIOTRIAZINE ACCELERATION

Ralph A. Naylor, Stamford, Conn., assignor to American Cyanamid Company, New York, N. Y., a corporation of Maine No Drawing. Application February 26, 1954, Serial No. 412,953

8 Claims. (Cl. 260—92.3)

This invention relates to the vulcanization of rubber. More particularly it is concerned with the vulcanization of chloroprene rubber and still more specifically it relates to the vulcanization of nonsulfur-modified chloroprene rubbers designated as Neoprene Type "W," Type "WHV" and Type "WRT."

It had been known prior to this invention that polymerized 2-chlorobutadiene 1,3 could be vulcanized with or without the aid of a vulcanization assistant. However, the chloroprene rubber so vulcanized or cured was deficient with respect to vulcanizate properties, such as modulus (i. e., stress at 300% elongation), tensile strength, percent elongation, the breaking point or aging characteristics.

In general, accelerators for rubber were of little or no value in curing synthetic rubbers known as polymerized chloroprene.

According to this invention, these difficulties are surprisingly and effectively overcome by adding to a formulation of chloroprene rubber a thio-substituted symmetrical triazine vulcanization accelerator characterized by the formula:

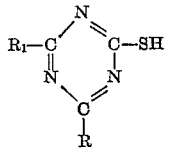

wherein R is mercapto or amino and $R_1$ is mercapto, 2-mercaptoarylthiazylamino, amino, arylamino, alkylamino, dialkylamino, cycloalkylamino, or N-alkyl-N-arylamino.

Among the substituted triazines I may use are: thioammeline, dithioammelide, trithiocyanuric acid, N-methyl-N-phenyl dithioammelide, N-phenyl dithioammelide, N-dibutyl dithioammelide, N-cyclohexyl dithioammelide and N-(2-thiobenzothiazyl) dithioammelide.

It has been further found that by increasing the thiol substituent from one to three, the activity with respect to tensile strength and modulus is rapidly improved. However, maximum activity is obtained with a di-N-substituted dithioammelide.

A synthetic chloroprene rubber made by polymerizing 2-chlorobutadiene 1,3 (known as neoprene) may be vulcanized or cured by adding the designated accelerator to an unvulcanized composition. Alternatively, the accelerator may be added to a partially cured neoprene polymer. As a preferred embodiment of the invention, it is preferred to accelerate the vulcanization of Neoprene Type "W." The latter neoprene is a nonsulfur-modified rubber made by the emulsion polymerization of chloroprene (2-chlorobutadiene 1,3) and which is devoid of sulfur, thiuram disulfide or other compounds capable of decomposing to provide either free sulfur or a vulcanization accelerator.

The amount of accelerator added to the rubber composition may vary from 0.25 to 2.5 parts of accelerator per 100 parts of polymer. However, for most purposes, the range may vary from 0.5–1.5 parts of accelerator per 100 parts of polymer.

Temperatures which can be employed to cure neoprene polymer compositions may vary from about 120° C. to 200° C. depending on the time of cure and amount of accelerator added. In general, adding larger amounts of accelerator to the composition and employing a longer curing time, the temperature should proportionately be reduced. It has been found that for the customary time of cure and accelerator addition, the temperature of curing may vary from about 140° C. and 160° C. For excellent results, a temperature of 153° C. is employed.

In the following example a typical stock formulation is illustrated with and without a vulcanization assistant. However, these examples are presented by way of illustration and not by way of limitation. The parts as designated in these examples are by weight.

Example 1

A batch mixture comprising the following:

| | |
|---|---|
| Neoprene Type W | 100 |
| Phenyl alpha naphthylamine | 2 |
| Stearic acid | 0.5 |
| Light calcined magnesia | 2 |
| Semi reinforcing furnace black | 29 |
| Zinc oxide | 5 |
| Thioammeline | 0.5 | is heated at 153° C. for 10, 20 and 40 minutes respectively.

Example 2

Example 1 is repeated with the omission of an accelerator.

Example 3

Example 1 is repeated except dithioammelide is substituted for the thioammeline vulcanization accelerator.

Example 4

Following the procedure of Example 1, trithiocyanuric acid is substituted for the vulcanization assistant therein.

Example 5

N-methyl-N-phenyl-dithioammelide replaces the accelerator of Example 1. The procedure of that example is then repeated.

Example 6

Following the procedure of Example 1, N-phenyl dithioammelide is substituted for the vulcanization assistant therein.

Example 7

Example 1 is repeated except dibutyl dithioammelide replaces the accelerator therein.

Example 8

In the procedure of Example 1, N-cyclohexyl dithioammelide replaces the accelerator therein.

Example 9

Example 1 is repeated, except N-(2-thiobenzothiazyl) dithioammelide replaces the accelerator therein.

The characteristics of the neoprene thus vulcanized in the foregoing examples are tabularized below.

| Example | Accelerator | Mooney Scorch[1] | 10 minutes at 153° C. | | | 20 minutes at 153° C. | | | 40 minutes at 153° C. | | |
|---|---|---|---|---|---|---|---|---|---|---|---|
| | | | Modulus at 300% | Tensile | Percent Elong. | Modulus at 300% | Tensile | Percent Elong. | Modulus at 300% | Tensile | Percent Elong. |
| 1 | Thioammeline | over 30 | 150 | 1,025 | 1,125 | 600 | 2,625 | 800 | 625 | 2,825 | 800 |
| 2 | None | over 70 | 75 | 600 | 900 | 500 | 2,575 | 800 | 575 | 2,700 | 780 |
| 3 | Dithioammelide | 43 | 250 | 1,650 | 940 | 675 | 3,100 | 780 | 700 | 2,925 | 720 |
| 4 | Trithiocyanuric acid | 12 | 675 | 2,750 | 760 | 875 | 3,200 | 700 | 1,200 | 3,225 | 590 |
| 5 | N-methyl N-phenyl dithioammelide | 12 | 1,125 | 3,275 | 620 | 1,125 | 3,425 | 630 | 1,175 | 3,250 | 590 |
| 6 | N-phenyl dithioammelide | 16 | 450 | 2,400 | 820 | 700 | 3,000 | 700 | 775 | 3,250 | 720 |
| 7 | Dibutyl dithioammelide | over 30 | 125 | 975 | 1,050 | 475 | 2,475 | 820 | 550 | 2,675 | 800 |
| 8 | N-cyclohexyl dithioammelide | | 225 | 1,425 | 100 | 600 | 2,775 | 760 | 825 | 3,100 | 720 |
| 9 | N-(2-thiobenzothiazyl) dithioammelide | over 30 | 150 | 1,100 | 1,150 | 550 | 2,750 | 810 | 775 | 3,225 | 740 |

[1] Mooney-scorch—time in minutes for a ten point rise above the minimum reading using the small rotor at 250° F. Modulus and tensile strength in p. s. i.

It can be readily seen from the above table that by increasing the thiol substituents, the vulcanizate characteristics are rapidly improved. Further, the best improvement is obtained with a di-N-substituted dithioammelide accelerator.

The vulcanized rubber made in accordance with this invention is useful for services wherein improved strength is desirable in addition to the normally good oil and heat resistance of the polymer, for example, as gasoline filling hoses or motor mountings.

Suitable variations and changes in the invention may be made without departing from the spirit thereof or the scope of the appended claims.

I claim:

1. A process for improving the modulus, tensile strength and elongation of chloroprene rubber compositions comprising adding to an unvulcanized vulcanizable chloroprene rubber composition between 0.25% and 2.5% of a symmetrical substituted thiotriazine, and curing said composition at vulcanization temperatures.

2. A process for improving the modulus, tensile strength and elongation of chloroprene rubber compositions comprising adding to an unvulcanized vulcanizable chloroprene rubber composition between 0.25% and 2.5% of a symmetrical thiotriazine accelerator characterized by the formula:

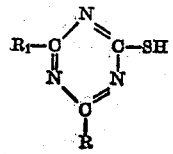

wherein R is the radical selected from the group consisting of mercapto and amino and $R_1$ is the radical selected from the group consisting of mercapto, 2-mercaptoarylthiazyl amino, amino, alkylamino, arylamino, dialkylamino, cycloalkylamino and N-alkyl N-aryl amino, and curing said composition at vulcanization temperatures.

3. The process according to claim 2 wherein the chloroprene rubber is a nonsulfur-modified chloroprene polymer.

4. The process according to claim 1 wherein the accelerator is dithioammelide.

5. The process according to claim 1 wherein the accelerator is trithiocyanuric acid.

6. A process according to claim 1 wherein the accelerator is N-methyl-N-phenyl dithioammelide.

7. A process according to claim 1 wherein the accelerator is N-phenyl dithioammelide.

8. The process according to claim 1 wherein the accelerator is dibutyl dithioammelide.

References Cited in the file of this patent

UNITED STATES PATENTS 2,544,746    Baum _____ Mar. 13, 1951